US011057740B2

(12) United States Patent
Duchon et al.

(10) Patent No.: US 11,057,740 B2
(45) Date of Patent: Jul. 6, 2021

(54) CUSTODIANSHIP MODEL FOR DECENTRALIZED TRACK FUSION

(71) Applicant: BAE Systems Information and Electronic Systems Integration Inc., Nashua, NH (US)

(72) Inventors: Eric N. Duchon, Arlington, MA (US); I-Ju L. Nelson, Lexington, MA (US); Sarah E. Li, Cambridge, MA (US); Helen M. Vo, South Lake Tahoe, CA (US); Daniel I. Zwillinger, Newton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 156 days.

(21) Appl. No.: 16/588,237

(22) Filed: Sep. 30, 2019

(65) Prior Publication Data

US 2021/0099838 A1 Apr. 1, 2021

(51) Int. Cl.
*H04W 4/029* (2018.01)
*G06K 9/00* (2006.01)
*G06K 9/62* (2006.01)

(52) U.S. Cl.
CPC ........ *H04W 4/029* (2018.02); *G06K 9/00805* (2013.01); *G06K 9/6288* (2013.01)

(58) Field of Classification Search
CPC ........... H04W 4/70; H04W 4/38; H04W 4/80; H04W 4/02; H04W 12/63; H04W 4/029; H04W 72/0426; H04W 74/008; H04W 74/02; H04W 74/0808; H04W 74/0833; G06K 2009/3291; G06K 9/00771; G06K 9/00805; G06K 9/6288
See application file for complete search history.

(56) References Cited

U.S. PATENT DOCUMENTS

| | | | |
|---|---|---|---|
| 2015/0356393 A1* | 12/2015 | Daoura | G06Q 10/10 340/8.1 |
| 2017/0046806 A1* | 2/2017 | Haldenby | G06Q 10/08 |
| 2019/0340588 A1* | 11/2019 | Haldenby | G06Q 40/128 |
| 2020/0322884 A1* | 10/2020 | Di Girolamo | H04W 4/70 |

* cited by examiner

*Primary Examiner* — Yuwen Pan
*Assistant Examiner* — Jing Gao
(74) *Attorney, Agent, or Firm* — Finch & Maloney PLLC (57) ABSTRACT

Techniques are provided for implementing a custodianship model for decentralized track fusion. A methodology implementing the techniques according to an embodiment includes negotiating, between a first decentralized track fuser (DTF) and one or more peer DTFs. The method also includes accepting, by the first DTF, custodianship of a track of an object from one of the peer DTFs based on a first negotiation. The method further includes updating, by the first DTF, the track based on fusion of data items associated with the track. The data items are received from one or more of the peer DTFs. The method further includes transferring, by the first DTF, custodianship of the updated track to one of the peer DTFs based on a second negotiation. In some cases, the transfer may be initiated by detection of a failure state of the first DTF.

22 Claims, 10 Drawing Sheets

CUSTODIANSHIP MODEL FOR DECENTRALIZED TRACK FUSION

STATEMENT OF GOVERNMENT INTEREST

This invention was made with United States Government assistance under Contract No. FA8620-14-G-3043, DO FA8620-F-18-4091 awarded by the United States Air Force. The United States Government has certain rights in this invention.

FIELD OF DISCLOSURE

The present disclosure relates to track fusion, and more particularly, to a custodianship model for track-to-track fusion in a decentralized/distributed system.

BACKGROUND

Systems for tracking objects of interest typically gather data on those objects from multiple sensors and data sources. The data is collected into a centralized tracker system that generates tracking results based on a fusion of the various data items. This approach can lead to problems however, particularly in challenging operational environments, where communication bandwidth may be limited, communication can be disrupted, and systems can fail, for example due to hostile activities.

Although the following Detailed Description will proceed with reference being made to illustrative embodiments, many alternatives, modifications, and variations thereof will be apparent to those skilled in the art.

DETAILED DESCRIPTION

Techniques are provided for decentralized/distributed track fusion using a custodianship model. A number of decentralized track fusers (DTFs) are deployed to track objects of interest within a geographic area. The track objects (TOs) represent the best estimates of the state of objects, given data from sensors and/or intelligence sources. A TO comprises fused data from one or more data sources, and may be derived from other TOs. According to an embodiment, a custodian is created for each TO. The custodian is hosted on a DTF and is responsible for managing and updating that TO. Custodians also handle resolution of track conflicts through negotiations with other custodians on other DTFs (referred to as peer DTFs), for example, to reduce the number of similar tracks. Additionally, custodians facilitate handovers and failovers of tracks between DTFs through further negotiations, as will be described in greater detail below.

The disclosed techniques can be implemented, for example, in a computing system or a software product executable or otherwise controllable by such systems, although other embodiments will be apparent. In accordance with an embodiment, a methodology to implement these techniques includes processing, by a first decentralized track fuser (DTF), a track of a first object. The method also includes publishing, by the first DTF, an intermediate result of the processing of the track of the first object, for reception by one or more peer DTFs to enable distributed processing of the track of the first object by the first DTF and the one or more peer DTFs. The method further includes listening, by the first DTF, for a message transmitted from any of the one or more peer DTFs and implementing a change in behavior of the first DTF based on the message, as will be described in greater detail below.

In some embodiments, the method also includes performing negotiations between a first DTF and one or more peer DTFs. In some embodiments, the negotiations employ a publish/subscribe communication protocol. The method may further include accepting custodianship, by the first DTF, of a track of an object from one of the peer DTFs based on a negotiation. The method may further include updating the track, by the first DTF, based on fusion of data items associated with the track. The data items are received from trackers (which obtain data from sensors) and/or one or more of the peer DTFs. The method may further include transferring, by the first DTF, custodianship of the updated track to one of the peer DTFs based on further negotiation. In some embodiments, custodianship transfer is based on detection of a failure state. The method may further include identifying duplicate tracks (e.g., under different custodians) and merging the duplicates through additional negotiations.

It will be appreciated that the techniques described herein may provide improved tracking performance with increased reliability, compared to existing techniques in which sensor data fusion is concentrated and isolated, which limits intelligence gathering, delays target identification, and increases risk of single point failures. In contrast, the disclosed techniques provide distributing tracking functionality and data fusion over a number of decentralized track fusers which allows for handovers and failovers of tracking custodianship to other DTFs as needed, and which is more robust to communication bandwidth limitations and hostile environments. These techniques may further be implemented in hardware or software or a combination thereof.

Figure 1:
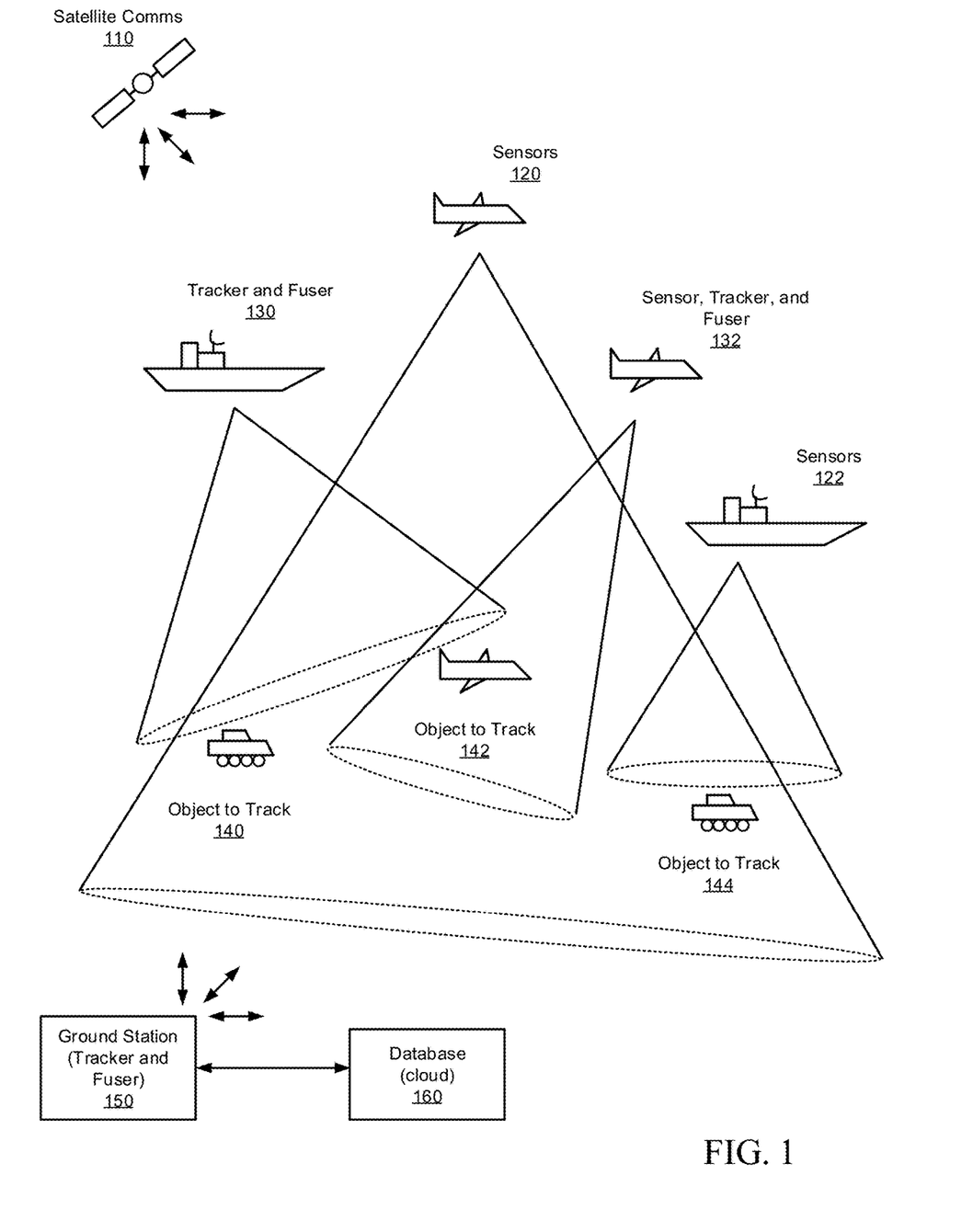
FIG. 1 illustrates a deployment of a decentralized/distributed track fusion system employing sensors, trackers, and track fusers, in accordance with certain embodiments of the present disclosure.

FIG. 1 illustrates a deployment 100 of a decentralized/distributed track fusion system, employing multiple sensors, trackers, and track fusers over a given geographic area, in accordance with certain embodiments of the present disclosure. The decentralized track fusion system is configured to track objects of interest in that geographic area. The objects may include vehicles (140, 144), aircraft (142), and/or any other type of object of interest; these objects are represented by tracks which are referred to herein as track objects or TOs.

Some of the sensors (120, 122) are shown as stand-alone sensors which may be hosted on a platform, but which are not co-located with a DTF on that platform. Also shown, are other platforms (130, 132) which may host a DTF or any combination of sensors, trackers, and DTFs. Platforms 120, 122, 130, and 132 are shown as aircraft and vessels for illustration, but can be any suitable platform including, for example, ground vehicles, man-portable devices, or handheld devices. Additionally, one or more ground stations (150) may be employed to host a DTF or any combination of sensors, trackers, and DTFs. Although only a few platforms and TOs are illustrated in this figure, for simplicity, in practice, a relatively large number of sensors and DTFs may be deployed to track a larger number of TOs, for example, tens or hundreds of platforms and TOs, or more.

The track of an object comprises a fusion of some or all of the collected data associated with that object. Additionally, in some embodiments, a track may include a state, a track identification number, a priority, a duration, and a pedigree. State data may include track data such as position, velocity, uncertainty, and other kinematic data associated with the object. Pedigree data may include information about previous TOs from which the track was derived/evolved, as well as information (or meta-information) about the sensor data that was used in the track creation (e.g., time range of measurements and types of sensor or intelligence source).

The sensors and DTFs are configured to communicate with any other sensor, DTF, ground station, etc., although communication bandwidth may vary depending on hardware capabilities of the platform and communication links may be intermittent depending on dynamic environmental conditions, including hostile environments (e.g., jamming). In some embodiments, one or more satellites 110 may be employed to provide additional communication capabilities between the various sensors, trackers, DTFs, and ground stations.

In some embodiments, the communications (including negotiations) employ a publish/subscribe communication protocol in which a transmitting platform publishes information and other platforms subscribe if they are interested in receiving information from the transmitting platform. In some embodiments, subscription groups may be employed, such that DTFs can subscribe to the communications of other DTFs that are members of groups of interest. Groups may be based, for example, on geographical areas of interest. In some embodiments, other suitable communication schemes and protocols may be used.

Additionally, in some embodiments, a database 160 may be employed to provide persistent data storage, for example for archiving, forensic analysis, detection of patterns over longer time periods, and/or subsequent review of tracks and tracking performance. The ground station(s) 150 may be configured to communicate with the database 160, which in some embodiments, may be cloud-based. In some further embodiments, the database 160 may be incorporated in one of the DTFs or in any suitable platform.

Figure 2:
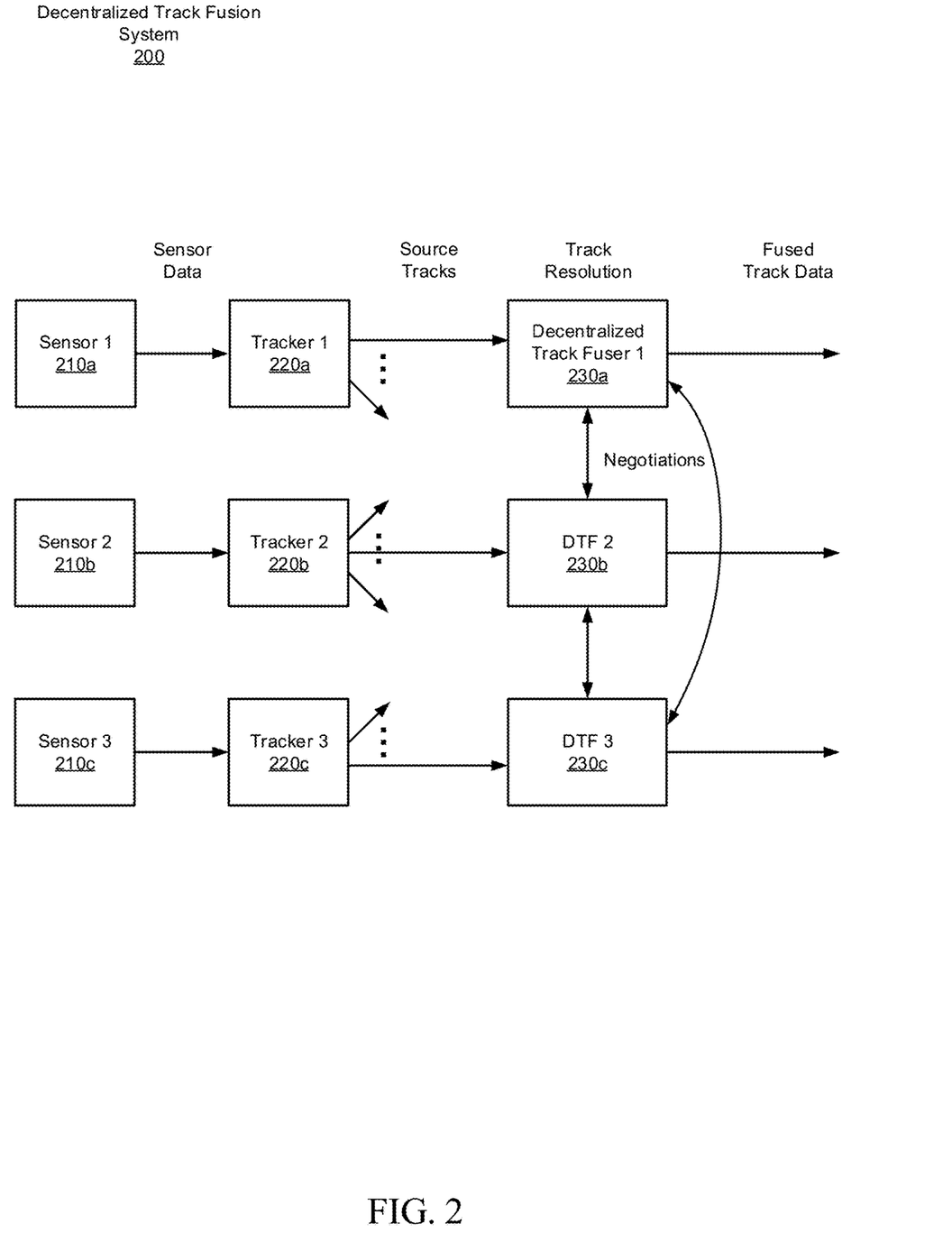
FIG. 2 is a block diagram of the decentralized track fusion system, configured in accordance with certain embodiments of the present disclosure.

FIG. 2 is a block diagram of the decentralized track fusion system 200, configured in accordance with certain embodiments of the present disclosure. The track fusion system 200 is shown to include multiple collections of sensors 210, trackers 220, and DTFs 230. For example, each sensor (210a, 210b, . . . ) may be configured to provide sensor data to an associated tracker 220. For example, sensor 1 (210a) provides sensor data to associated tracker 1 (220a).

Each tracker (220a, 220b, . . . ) is configured to generate source tracks (the data source being the associated sensors) and provide these source tracks to one or more DTFs (230a, 230b, . . . ) that are listening (e.g., subscribed). The DTFs are configured to negotiate with one another to provide track resolution, as will be described in greater detail below. Each track is managed by a custodian which is hosted on one of the DTFs. Descriptions of the DTF system 200 in the present disclosure will often refer to one DTF as an example (e.g., DTF 1 230a), and further describe operations and interactions between that DTF and other "peer" DTFs (e.g., DTF 2 230b, DTF 3 230c, etc.). It will be appreciated, however, that the described operations and interactions can be applied to any of the DTFs and their associated peer DTFs.

Figure 3:
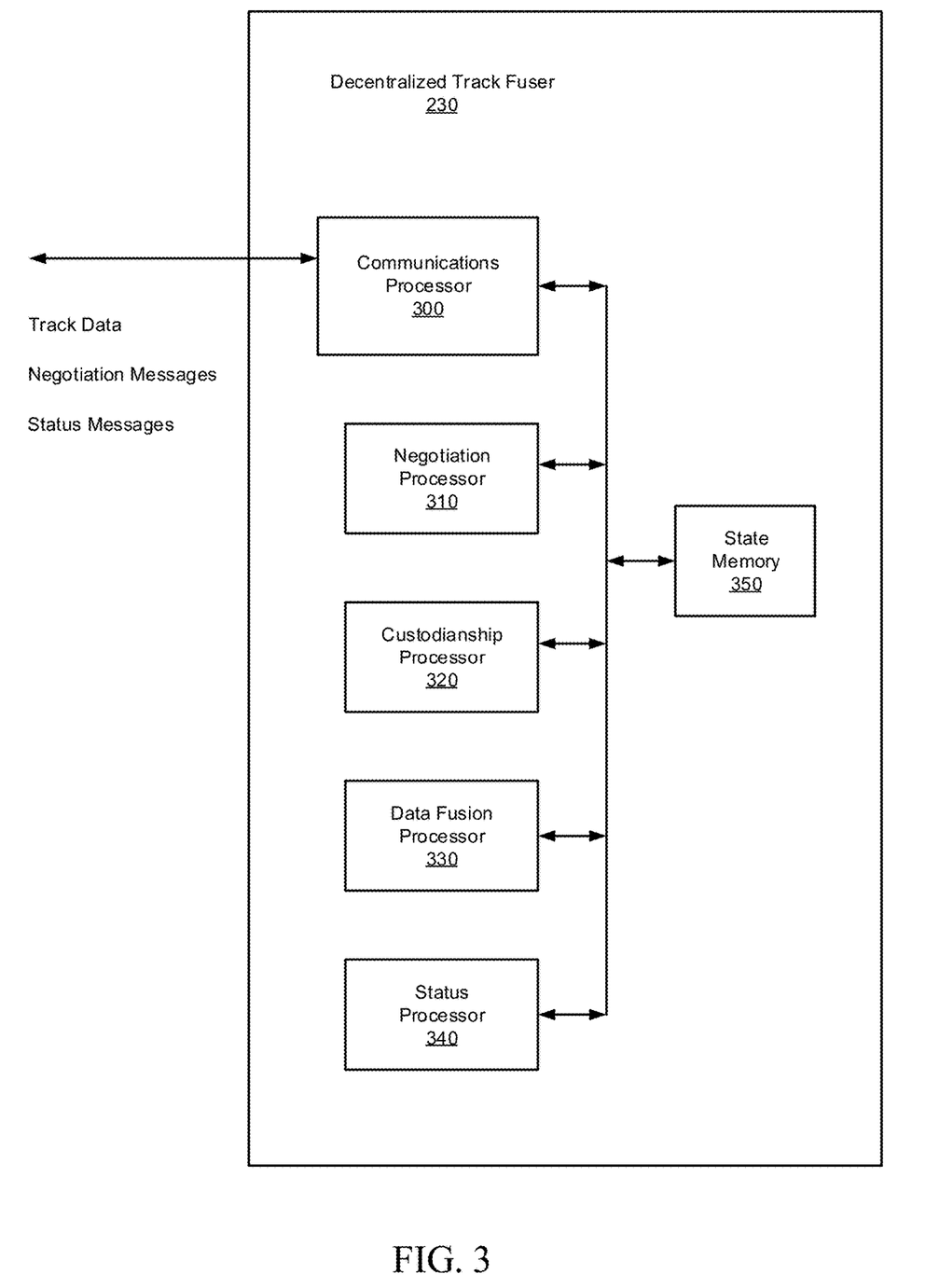
FIG. 3 is a block diagram of a decentralized track fuser, configured in accordance with certain embodiments of the present disclosure.

FIG. 3 is a block diagram of a decentralized track fuser 230, configured in accordance with certain embodiments of the present disclosure. The DTF 230 is shown to include a communications processor/circuit 300, a negotiation processor/circuit 310, a custodianship processor/circuit 320, a data fusion processor/circuit 330, and a status processor/circuit 340.

The communications processor 300 is configured to perform communication with other DTFs (and/or other entities, such as, for example centralized command facilities or human operators). Information to be communicated may include sensor data, track data, negotiation messages, and status messages. In some embodiments, the communications are performed using a publish/subscribe communication protocol, although other suitable protocols may be used.

The negotiation processor 310 is configured to perform negotiations, between the DTF and one or more peer DTFs of the DTF system, using the communications processor 300. Negotiations may include, for example, determination of track custodianship and merging of duplicate tracks, as will be described below.

The custodianship processor 320 is configured to accept custodianship of a TO from a peer DTF, based on negotiation with the peer DTF, and to manage that TO. The custodian processing circuit is also configured to create new TOs, accept custodianship of those tracks, manage and update those tracks, and potentially transfer custodianship of those tracks to one of the peer DTFs at a future time based on changing conditions and negotiations with the other peer DTFs. Custodianship transfers may include handovers, in which one DTF takes over for another DTF in a planned manner. Custodianship transfers may also include failovers, in which one DTF takes over for another DTF in response to an unplanned failure, inadequate DTF resources, and/or communication limitations.

Figure 4:
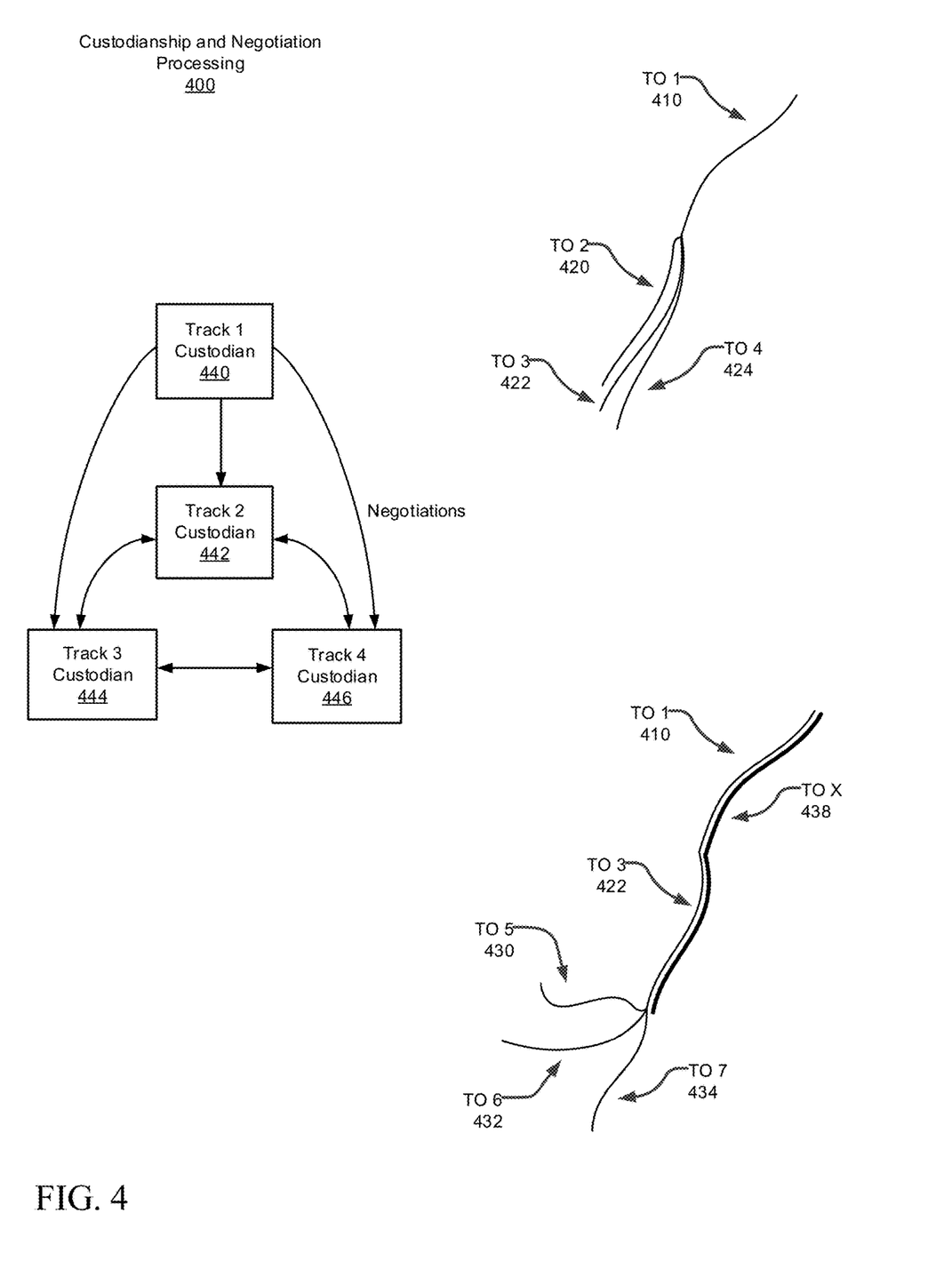
FIG. 4 illustrates custodianship and negotiation processing of track objects, in accordance with certain embodiments of the present disclosure.

The data fusion processor 330 is configured to update the TOs that are under custodianship of the DTF. The update is based on fusion of data items associated with the track. The data items are received from trackers and/or one or more of the peer DTFs. The data fusion processor circuit is also configured to identify duplicates of tracks based on negotiations with peer DTFs. It will be understood that the term "duplicate" does not imply exact duplication. For example, two TOs may be considered to be duplicates if the track data of the tracks are similar to within a selected threshold difference. The duplication negotiations may include kinematics data and/or pedigree data associated with the duplicate TOs. The TO and any identified duplicates may then be merged to improve efficiency of the DTF system and reduce clutter on operator displays. Data fusion processor circuit 330 is further configured to concatenate (e.g., stitch together) two or more TOs associated with the same TO. The merging and concatenation of tracks are illustrated in FIG. 4 and described in greater detail below.

The status processor 340 is configured to monitor the state of the DTF. The status processor may perform measurements and make those measurements available to other processors in the DTF and/or other peer DTFs as needed, for example as part of a negotiation. Measurements may include, for example, percentage of total DTF processing capacity being used, current latency of the DTF, the number of tracks being managed by custodians on the DTF, and any other suitable metrics.

Custodianship of tracks may be transferred to one of the peer DTFs based on detection of a failure state of a DTF. In some embodiments, 3 types of custodianship transfers may be performed. These are referred to as "cold start," "warm start," and "hot start."

In a cold start transfer, a replacement DTF is ready to begin to collect and process track data for a transferred track.

In a warm start transfer, a replacement DTF already has intermediate tracking results, and can therefore begin managing the transferred track more quickly. For example, the custodian processing circuit of the replacement DTF receives results of fusion of data items associated with the track from the current custodian DTF, for a selected period of time prior to accepting the custodianship of the track.

In a hot start transfer, the replacement DTF is already performing the track update computations, but not publishing the results until the current custodian DTF fails or otherwise ceases to publish tracking results. For example, custodianship of the track is being maintained by the primary current custodian DTF and the potential backup/replacement custodian DTF, but the replacement custodian DTF suppresses results of updating the track until detection of a failure state of the current custodian DTF.

FIG. 4 illustrates custodianship and negotiation processing 400 of track objects, in accordance with certain embodiments of the present disclosure. In this example, an existing track object (TO 1 410) is followed by the creation of three new track objects (TOs 2-4: 420, 422, 424) based on TO 1. Track 1 custodian 440 assesses the three new derived TOs and decides that some of these TOs should be deleted based on their pedigree. Subsequently, the custodians (e.g., 442, 444, 446) of any undeleted new TOs (which were all created at about the same time) negotiate among themselves (e.g., conduct a peer level review) to determine if any of those TOs should be deleted based on similarity to one another. For example, a result of the negotiations could be that TOs 2 and 4 are deleted and TO 3 remains. A derived TO X comprised of TOs 1 and 3 is created and a custodian assigned. As time progresses, three additional new TOs are created (TOs 5-7: 430, 432, 434) based on TOs 1, 3, and/or X and the process continues. Any of TOs 5 through 7 may be merged or deleted, or it may be determined that some of these TOs are legitimate new track objects which are to be maintained.

Methodology

FIGS. 5-9 are flowcharts illustrating methodologies for decentralized/distributed track fusion, in accordance with certain other embodiments of the present disclosure. As can be seen, the example methods 500, 600, 700, 800, 900 include a number of phases and sub-processes, the sequence of which may vary from one embodiment to another. However, when considered in the aggregate, these phases and sub-processes form a process for decentralized track fusion, in accordance with certain of the embodiments disclosed herein. These embodiments can be implemented, for example using the system architecture illustrated in FIGS. 1-4, as described above. However other system architectures can be used in other embodiments, as will be apparent in light of this disclosure. To this end, the correlation of the various functions shown in FIGS. 5-9 to the specific components illustrated in FIGS. 1-4 are not intended to imply any structural and/or use limitations. Rather other embodiments may include, for example, varying degrees of integration wherein multiple functionalities are effectively performed by one system. Numerous variations and alternative configurations will be apparent in light of this disclosure.

Figure 5:
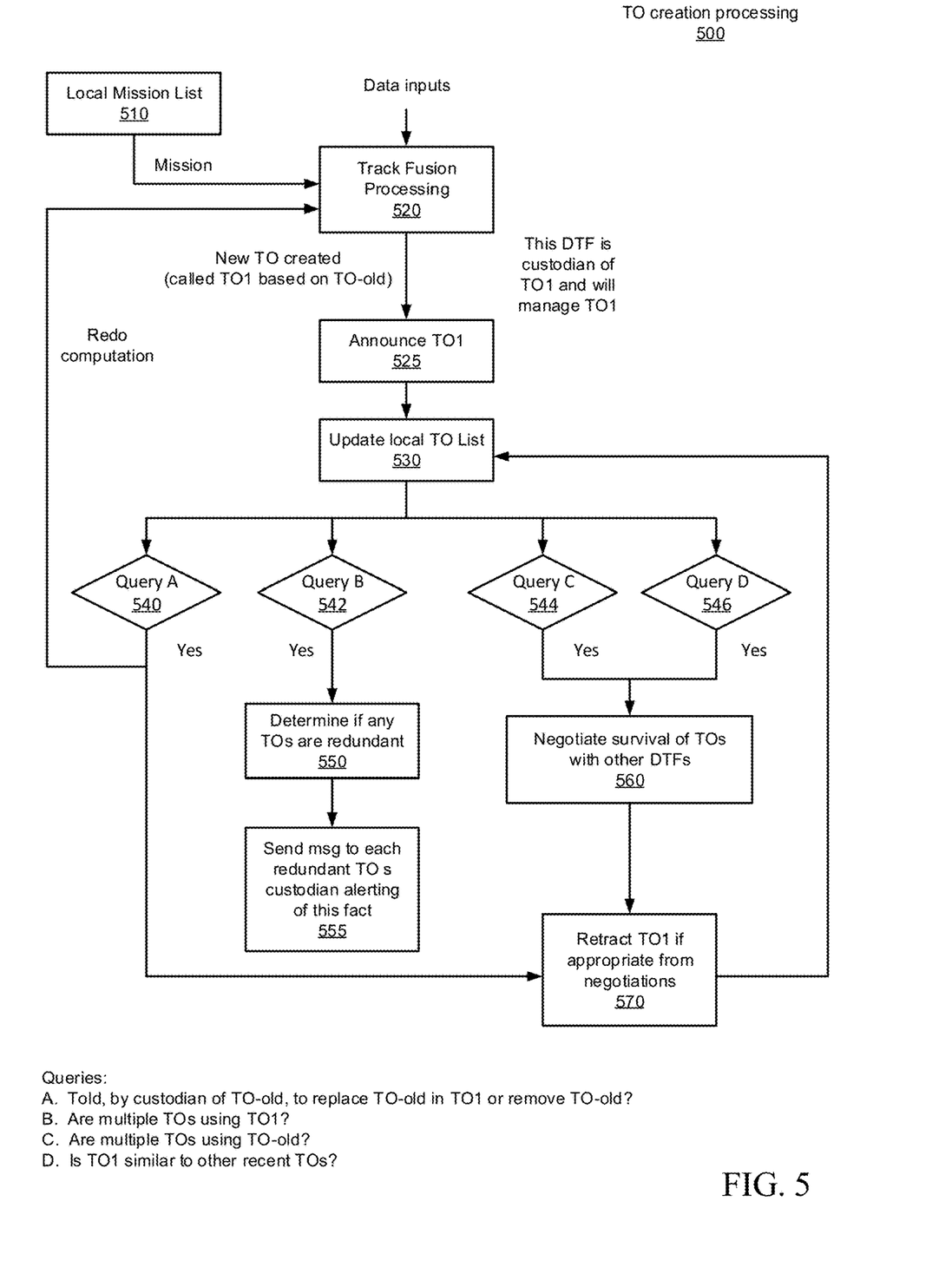
FIG. 5 is a flowchart illustrating a methodology for track object creation, in accordance with certain other embodiments of the present disclosure.

FIG. 5 is a flowchart illustrating a methodology 500 for track object (TO) creation, by a DTF, in accordance with certain other embodiments of the present disclosure.

As illustrated in FIG. 5, in one embodiment method 500 commences, at operation 520, by performing track fusion processing for track missions, from a local mission list 510, based on data inputs received from sensors, intelligence sources, and/or other peer DTFs. In some embodiments, the local mission list 510 may contain a prioritized set of missions assigned to the DTF by an operator. Track fusion computations result in the creation of a new track object, now referred to as TO1, derived from an existing track object identified as TO-old. This DTF now becomes the custodian of TO1 and will manage TO1.

At operation 525, the creation of TO1 is announced over the network, and at operation 530, the local TO list is updated to include TO1.

At operation 540, query A (told, by custodian of TO-old, to replace TO-old in TO1 or remove TO-old?) is evaluated. If the custodian of TO-old directs this DTF to replace TO-old in TO1 or remove TO-old, then further track fusion computations are performed (operation 520), and TO1 may need to be retracted (operation 570).

At operation 542, query B (are multiple TOs using TO1?) is evaluated. If multiple track objects are using TO1, then, at operation 550, a determination is made as to whether any TOs are redundant. At operation 555, a message is sent to the custodian of each redundant TO alerting them that the TO is redundant.

At operations 544 and 546, queries C and D are evaluated. If either multiple TOs are using TO-old, or if TO1 is similar to other recent TOs, then at operation 560, a negotiation is performed with the peer DTFs to determine the survival of those TOs. This negotiation is described below in connection with FIG. 6. At operation 570, TO1 may be retracted if appropriate based on the negotiations.

Figure 6:
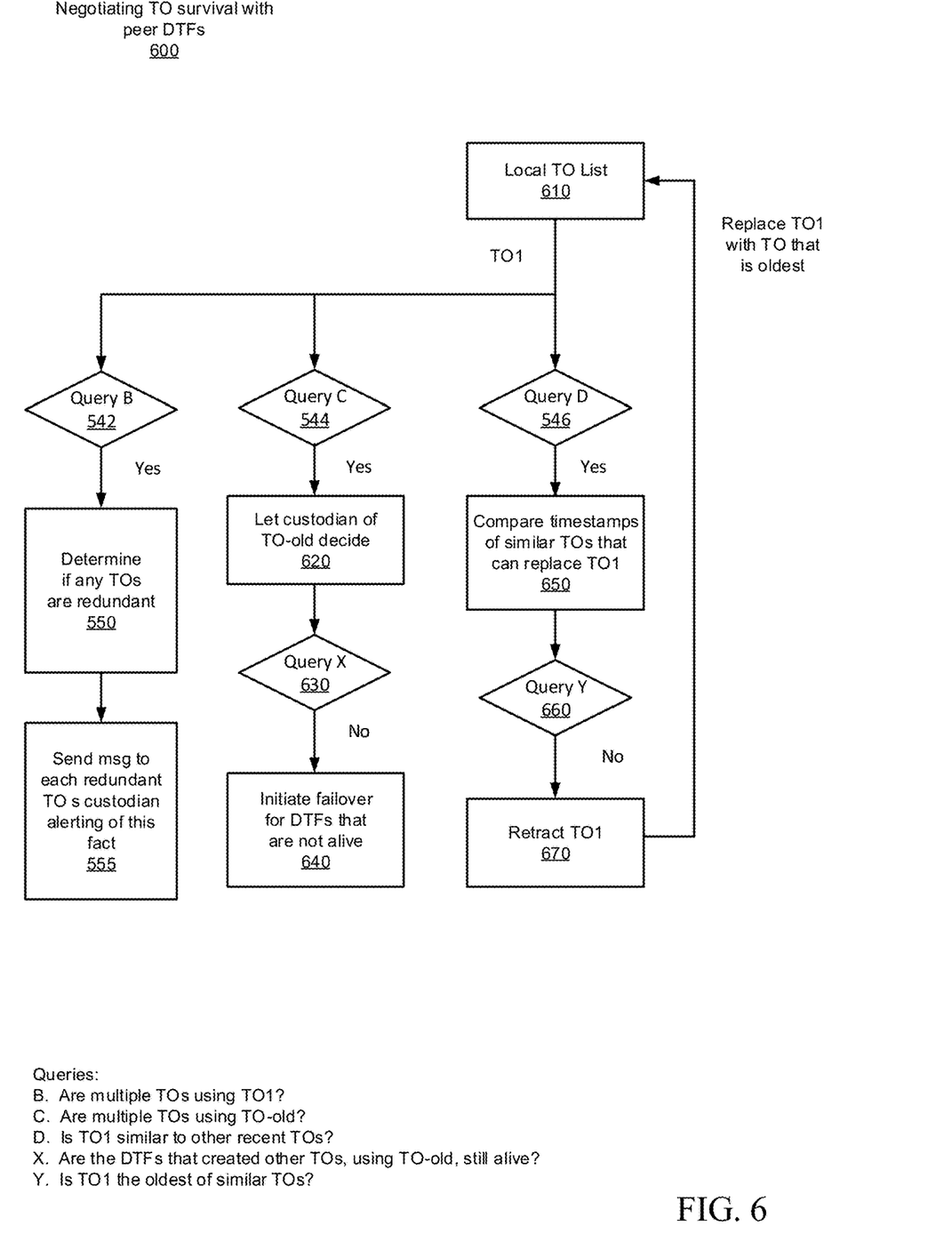
FIG. 6 is a flowchart illustrating a methodology for negotiation of track object survival, in accordance with certain other embodiments of the present disclosure.

FIG. 6 is a flowchart illustrating a methodology 600 for negotiation of track object survival, in accordance with certain other embodiments of the present disclosure.

At operation 542, query B is evaluated. If multiple track objects are using TO1, then, at operations 550, a determination is made as to whether any TOs are redundant. At operation 555, a message is sent to the custodian of each redundant TO alerting them that the TO is redundant.

If the result of Query C 544 (are multiple TOs using TO-old?) is yes, then at operation 620, the custodian of TO-old is allowed to decide survival. Continuing this branch, at operation 630, query X (are the DTFs that created other TOs, using TO-old, still alive?) is evaluated. If peer DTFs that created other TOs, using TO-old, are not still alive then, at operation 640, failover is initiated for those DTFs.

If the result of Query D 546 (is TO1 similar to other recent TOs?) is yes, then at operation 650, the timestamps of similar TOs that could replace TO1 are compared. Continuing this branch, at operation 660, query Y (is TO1 the oldest of similar TOs?) is evaluated. If TO1 is not the oldest of the similar TOs, then, at operation 670, TO1 is retracted and replaced in the local TO list 610 with the oldest TO.

Figure 7:
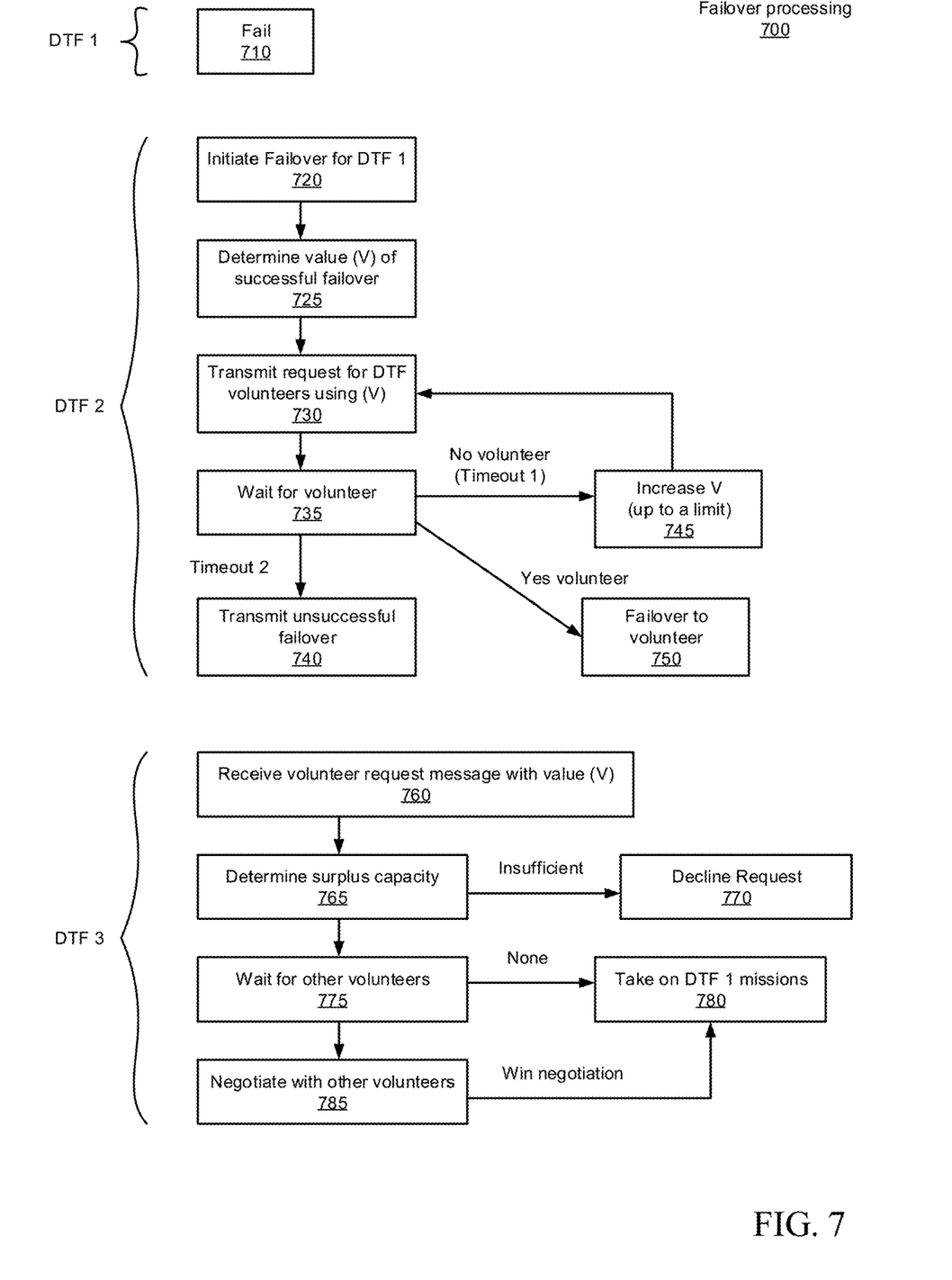
FIG. 7 is a flowchart illustrating a methodology for failover processing, in accordance with certain other embodiments of the present disclosure.

FIG. 7 is a flowchart illustrating a methodology 700 for failover processing, in accordance with certain other embodiments of the present disclosure. In this example, DTF 1 is shown to enter a failure state 710. Then, at operation 720, DTF 2 initiates failover processing for DTF 1, and operations 725 through 750 are performed by DTF 2 for that purpose as follows. Failover processing may be initiated, for example, if a heartbeat message from DTF 1 is no longer detected. A heartbeat message is a type of status message that is transmitted periodically to indicate that the DTF is operating in an acceptable manner.

At operation 725, a value (V) is determined for a successful failover, and at operation 730 a request is transmitted to peer DTFs for a volunteer to accept the failover. The request message includes the value (V). At operation 735, DTF 2 waits for a volunteer. If no volunteer is forthcoming after a first timeout period, then value (V) is increased at operation 745 (up to a selected limit) and the volunteer request is re-transmitted with the new value, at operation 730.

If a volunteer is found, then, at operation 750, a failover to that volunteer is performed. If, however, no volunteer is found after a selected maximum waiting time (timeout 2 which is greater than timeout 1), then, at operation 740, a message is transmitted to indicate that the failover was unsuccessful.

Further to this example, the operations of one of the peer DTFs (e.g., DTF 3) are shown, as related to consideration of acceptance of the failover. Operations 760 through 785 are performed by DTF 3 for that purpose as follows. At operation 760, the volunteer request message, with value (V), is received from DTF 2. Next, at operation 765, a determination is made as to whether DTF 3 has sufficient surplus capacity to take on the failover in light of the specified value. If the capacity is not sufficient, then, at operation 770, the request is declined.

Otherwise, at operation 775, DTF 3 waits, for a period of time, for other volunteers to come forward. In some embodiments, the time period could be deterministic or random. If no other volunteers are detected, then, at operation 780, DTF 3 accepts the failover (e.g., takes on the missions of DTF 1).

If other volunteers are detected, then, at operation 785, a negotiation is conducted between DTF 3 and the other volunteering DTFs. If DTF 3 wins the negotiation, then, at operation 780, DTF 3 accepts the failover.

Figure 8:
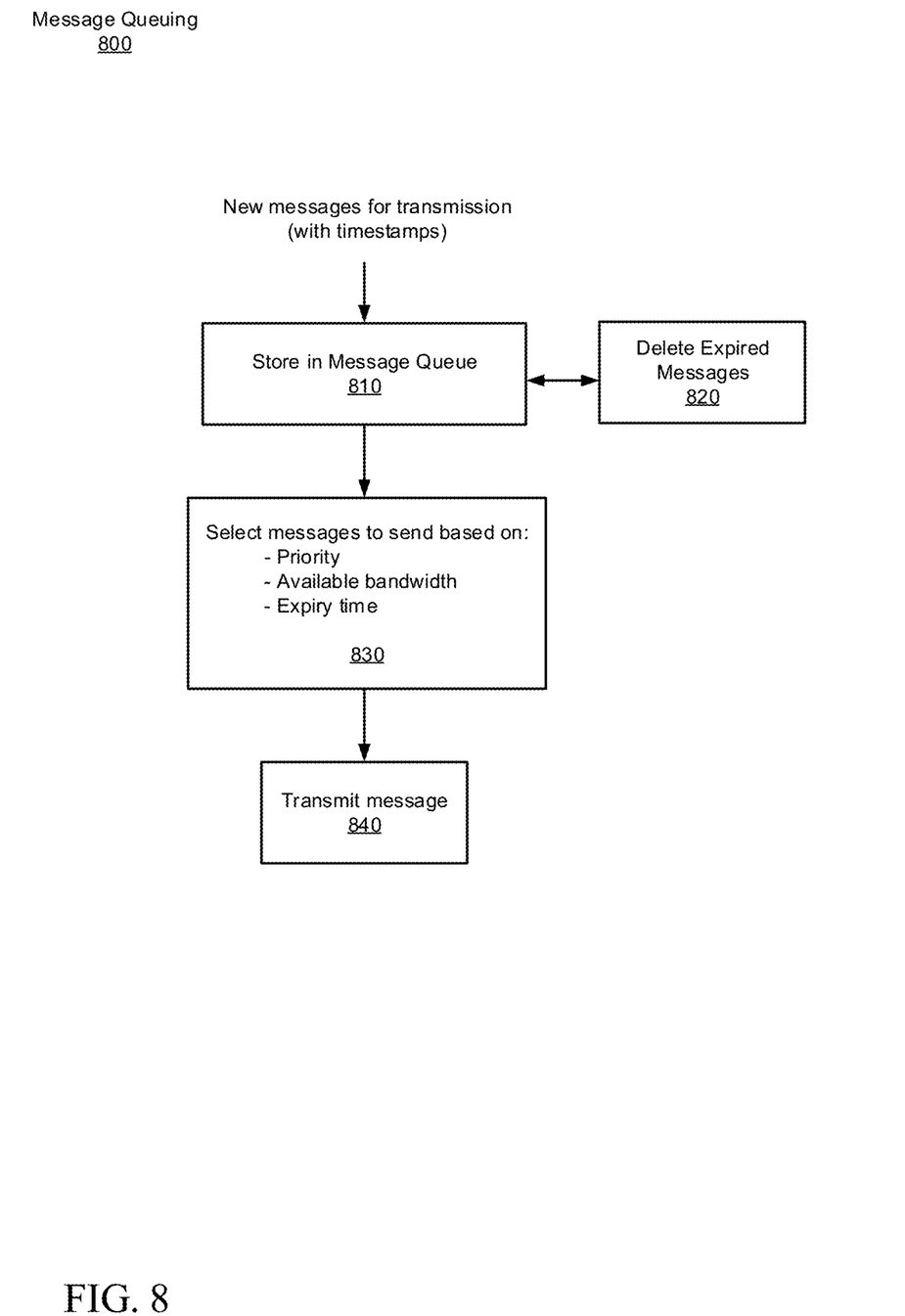
FIG. 8 is a flowchart illustrating a methodology for message queueing, in accordance with certain other embodiments of the present disclosure.

FIG. 8 is a flowchart illustrating a methodology 800 for message queueing, in accordance with certain other embodiments of the present disclosure. At operation 810, new message for transmission (including timestamps) are stored in a message queue. At operation 820, the message queue is periodically checked for expired messages, which are then deleted from the queue. At operation 830, messages are selected from the queue for transmission based on a number of factors including message priority, available bandwidth, and expiration time. At operation 840, the selected messages are transmitted.

Figure 9:
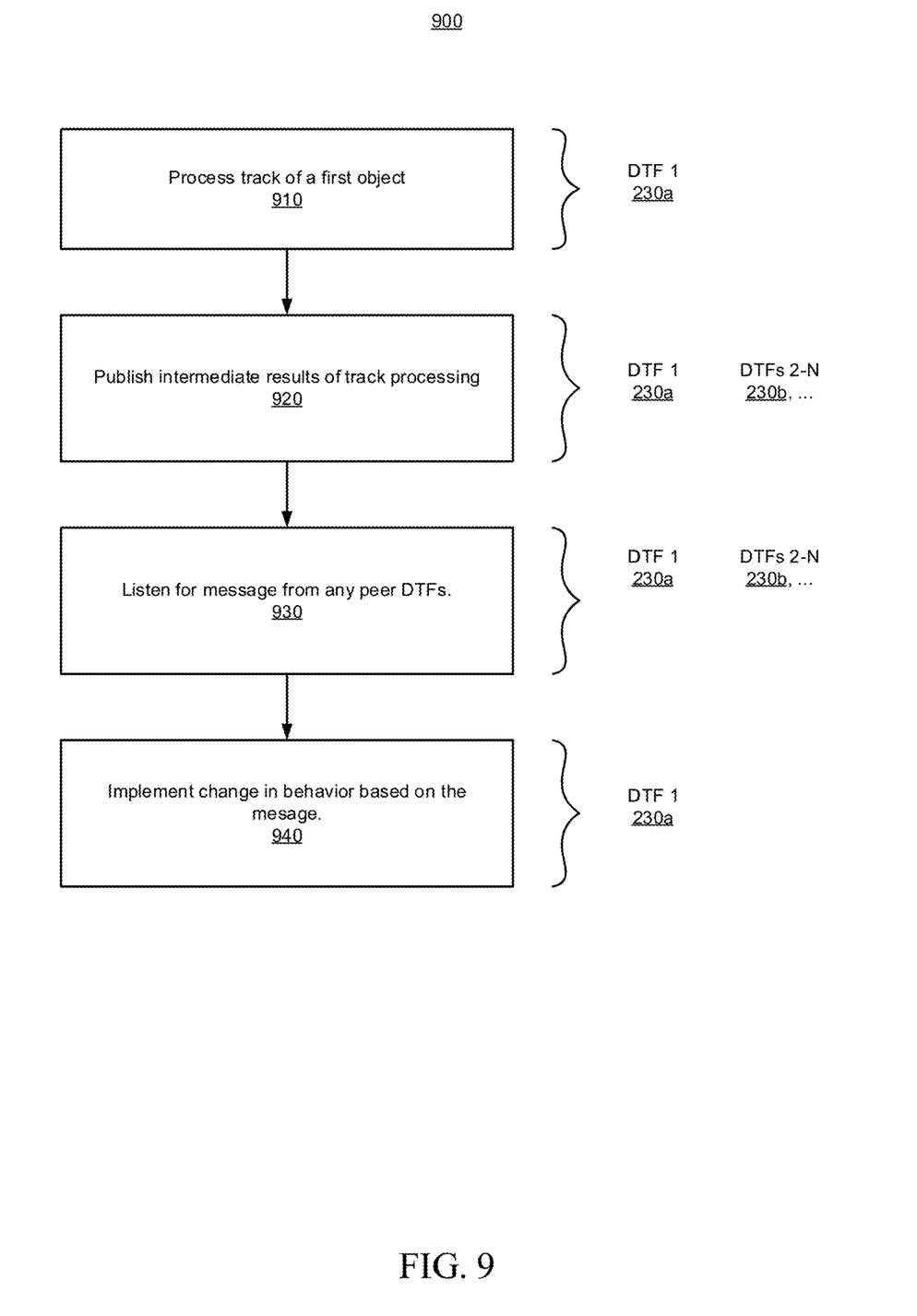
FIG. 9 is a flowchart illustrating a methodology for decentralized track fusion, in accordance with certain other embodiments of the present disclosure.

FIG. 9 is a flowchart illustrating a methodology 900 for decentralized track fusion, in accordance with certain other embodiments of the present disclosure. Method 900 commences, at operation 910, by processing a track of a first object on a first DTF.

Next, at operation 920, the first DTF publishes intermediate results of the processing of the track of the first object, for reception by one or more peer DTFs to enable distributed processing of the track of the first object by the first DTF and one or more peer DTFs.

At operation 930, the first DTF listens for a message transmitted from any of the one or more peer DTFs, and at operation 940, the first DTF implements a change in behavior based on the message. The change in behavior may be a performance of an action by the DTF, the cessation of an action by the DTF, or a change of state of the DTF. For example, in some embodiments, messages are negotiation messages, and the change in behavior includes accepting custodianship of a track of a second object from one of the peer DTFs or transferring custodianship of a track of the first object to one of the peer DTFs, based on the nature of the negotiation. In some embodiments, the message includes a failure status of one of the peer DTFs and the change in behavior is accepting custodianship of a track of a second object from the failing peer DTF. In some embodiments, the message includes data associated with the track of the first object and the change in behavior is updating the track of the first object based on a fusion of the data included in the message with existing data associated with the track of the first object.

Of course, in some embodiments, additional operations may be performed, as previously described in connection with the system. These additional operations may include, for example, identifying and merging or pruning duplicate tracks (e.g., under different custodians) through further negotiations. In some further embodiments, a new track may be created, which is derived from two or more tracks on object.

Example Platforms

Figure 10:
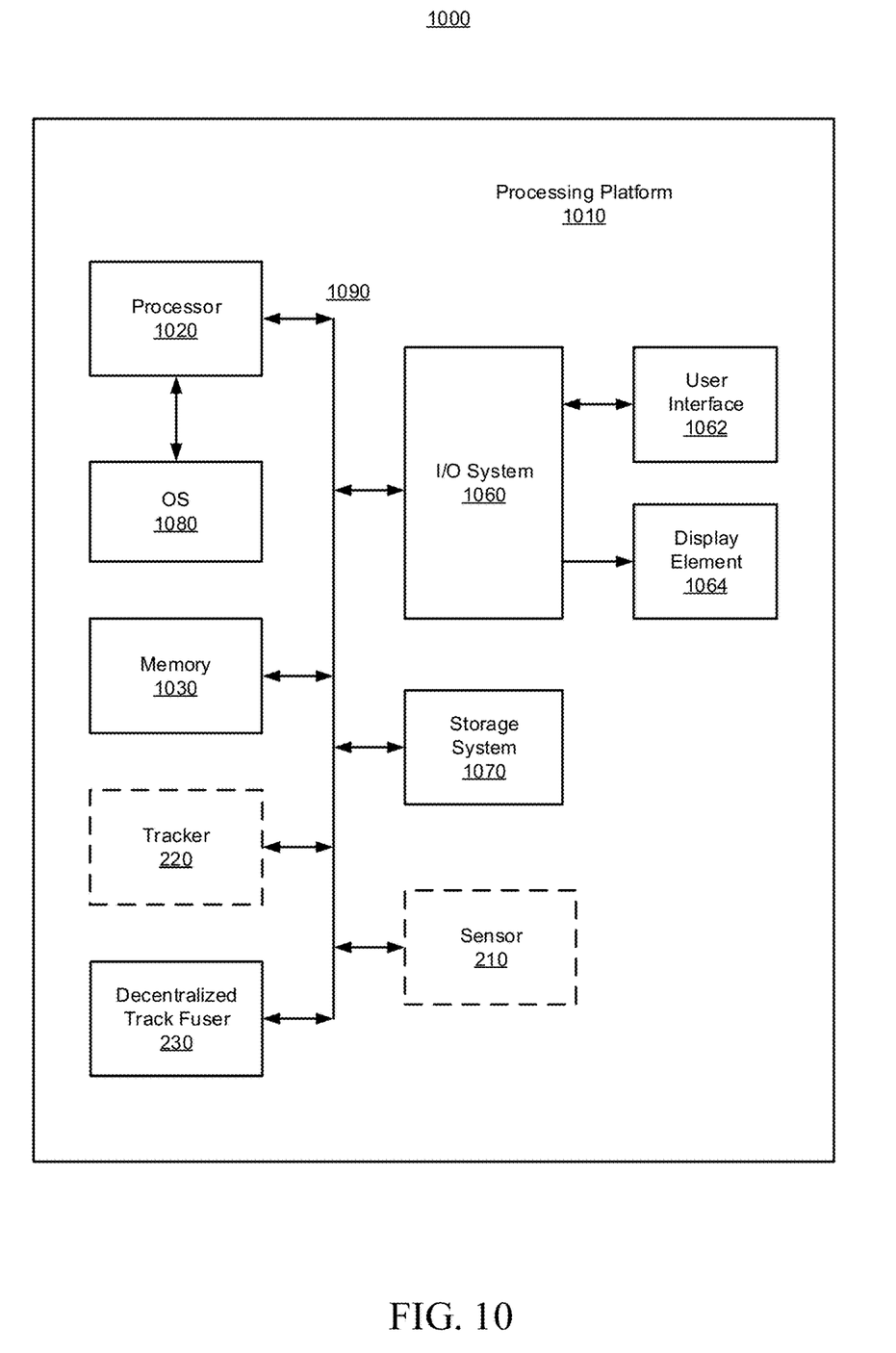
FIG. 10 is a block diagram schematically illustrating a platform employing the disclosed decentralized track fuser, in accordance with certain embodiments of the present disclosure.

FIG. 10 is a block diagram 1000 schematically illustrating an example processing platform 1010 implementing the disclosed decentralized/distributed track fuser, in accordance with certain embodiments of the present disclosure. In some embodiments, platform 1010 may be hosted on, or otherwise be incorporated into an aircraft, a vessel, a vehicle, a ground station, or any other suitable platform, or the electronic systems thereof.

In some embodiments, platform 1010 may comprise any combination of a processor 1020, a memory 1030, an input/output (I/O) system 1060, a user interface 1062, a display element 1064, a storage system 1070, a decentralized track fuser 230, an optional tracker 220, and optional sensor(s) 210. As can be further seen, a bus and/or interconnect 1090 is also provided to allow for communication between the various components listed above and/or other components not shown. Other componentry and functionality not reflected in the block diagram of FIG. 10 will be apparent in light of this disclosure, and it will be appreciated that other embodiments are not limited to any particular hardware configuration.

Processor 1020 can be any suitable processor, and may include one or more coprocessors or controllers, such as an audio processor, a graphics processing unit, or hardware accelerator, to assist in control and processing operations associated with platform 1010. In some embodiments, the processor 1020 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1020 may be implemented as a complex instruction set computer (CISC) or a reduced instruction set computer (RISC) processor.

Memory 1030 can be implemented using any suitable type of digital storage including, for example, flash memory and/or random-access memory (RAM). In some embodiments, the memory 1030 may include various layers of memory hierarchy and/or memory caches as are known to those of skill in the art. Memory 1030 may be implemented as a volatile memory device such as, but not limited to, a RAM, dynamic RAM (DRAM), or static RAM (SRAM) device. Storage system 1070 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 1020 may be configured to execute an Operating System (OS) 1080 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 1010, and therefore may also be implemented using any suitable existing or subsequently-developed platform.

I/O system 1060 may be configured to interface between various I/O devices and other components of platform 1010. I/O devices may include, but not be limited to, user interface 1062 and display element 1064. User interface 1062 may include other devices (not shown) such as a touchpad, keyboard, mouse, microphone and speaker, trackball or scratch pad, and camera. I/O system 1060 may include a graphics subsystem configured to perform processing of images for rendering on the display element 1064. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1020 or any chipset of platform 1010.

It will be appreciated that in some embodiments, some of the various components of platform 1010 may be combined or integrated in a system-on-a-chip (SoC) architecture. In some embodiments, the components may be hardware components, firmware components, software components or any suitable combination of hardware, firmware or software.

Decentralized track fuser 230 is configured to perform decentralized fusion of tracks in cooperation with other peer DTFs through negotiations and other communications, as described previously. DTF 230 may include any or all of the circuits/components/architecture illustrated in FIG. 3 as described above. These components can be implemented or otherwise used in conjunction with a variety of suitable software and/or hardware that is coupled to or that otherwise forms a part of platform 1010.

Various embodiments of platform 1010 may be implemented using hardware elements, software elements, or a combination of both. Examples of hardware elements may include processors, microprocessors, circuits, circuit elements (for example, transistors, resistors, capacitors, inductors, and so forth), integrated circuits, application-specific integrated circuits (ASICs), programmable logic devices, digital signal processors, field-programmable gate arrays (FPGAs), logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, causes one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments platform 1010 may comprise additional, fewer, or alternative subcomponents as compared to those included in the example embodiment of FIG. 10.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as an FPGA, or alternatively, a purpose-built semiconductor such as an ASIC. In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an ASIC, an SoC, computers, and other processor-based or functional systems. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, ASICs, programmable logic devices (PLD), digital signal processors (DSP), FPGAs, logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

One example embodiment of the present disclosure provides a method for decentralized track fusion comprising: processing, by a first decentralized track fuser (DTF), a track of a first object; publishing, by the first DTF, an intermediate result of the processing of the track of the first object, for reception by one or more peer DTFs to enable distributed processing of the track of the first object by the first DTF and the one or more peer DTFs; listening, by the first DTF, for a message transmitted from any of the one or more peer DTFs; and implementing, by the first DTF, a change in behavior of the first DTF based on the message.

In some cases, the message is a negotiation message and the change in behavior is accepting custodianship of a track of a second object from one of the one or more peer DTFs. In some cases, the message is a negotiation message and the change in behavior is transferring custodianship of a track of the first object to one of the one or more peer DTFs. In some cases, the message includes a failure status of one of the one or more peer DTFs and the change in behavior is accepting custodianship of a track of a second object from the one of the one or more peer DTFs.

In some cases, a failure to detect a heartbeat message of one of the one or more peer DTFs results in the change in behavior, and the change in behavior is accepting custodianship of a track of a second object from the one of the one or more peer DTFs. In some cases, the message includes data associated with the track of the first object and the change in behavior is updating the track of the first object based on a fusion of the data included in the message with existing data associated with the track of the first object. In some cases, the method further comprises identifying, by the first DTF, a duplicate track, the duplicate track differing from the track of the first object by less than a threshold difference, the identification based on a negotiation with one of the one or more peer DTFs, the negotiation including kinematics data associated with the duplicate track and/or pedigree data associated with the duplicate track. In some such cases, the method further comprises merging, by the first DTF, the track of the first object and the duplicate track based on the identification. In some cases, the method further comprises receiving, by the first DTF, results of fusion of data items associated with a track of a second object from one of the one or more peer DTFs for a period of time prior to accepting custodianship of the track of the second object from the one of the one or more peer DTFs. In some cases, the method further comprises suppressing, by the first DTF, publishing the intermediate result of the processing of the track of the first object until detection of a failure state of one of the one of the peer DTFs, the first DTF serving as a backup custodian of the track of the first object and the one of the one of the peer DTFs serving as a primary custodian of the track of the first object. In some cases, the method further comprises creating a new track derived from the track of the first object and a second track of the first object.

Another example embodiment of the present disclosure provides a decentralized track fuser (DTF) comprising: a data fusion processor circuit to process a track of a first object; a communications processor to publish an intermediate result of the processing of the track of the first object, for reception by one or more peer DTFs to enable distributed processing of the track of the first object by the DTF and the one or more peer DTFs; and the communications processor further to listen for a message transmitted from any of the one or more peer DTFs, the DTF to implement a change in behavior based on the message.

In some cases, the DTF further comprises: a negotiation processor to perform negotiations between the DTF and the one or more peer DTFs; and a custodianship processor to accept or transfer custodianship of a track of an object between the DTF and the one or more peer DTFs. In some such cases, the message is a negotiation message and the change in behavior is accepting, by the custodianship processor, custodianship of a track of a second object from one of the one or more peer DTFs. In some such cases, the message is a negotiation message and the change in behavior is transferring, by the custodianship processor, custodianship of a track of the first object to one of the one or more peer DTFs. In some such cases, a failure to detect a heartbeat message of one of the one or more peer DTFs results in the change in behavior, and the change in behavior is accepting custodianship of a track of a second object from the one of the one or more peer DTFs. In some such cases, the message includes a failure status of one of the one or more peer DTFs and the change in behavior is accepting, by the custodianship processor, custodianship of a track of a second object from the one of the one or more peer DTFs. In some cases, the data fusion processor is further to identify a duplicate track, the duplicate track differing from the track of the first object by less than a threshold difference, the identification based on a negotiation with one of the one or more peer DTFs, the negotiation including kinematics data associated with the duplicate track and/or pedigree data associated with the duplicate track. In some such cases, the data fusion processor is further to merge the track of the first object and the duplicate track based on the identification. In some cases, the custodian processing circuit is further to receive results of fusion of data items associated with a track of a second object from one of the one or more peer DTFs for a period of time prior to accepting custodianship of the track of the second object from the one of the one or more peer DTFs. In some cases, the communication processor is further to suppress publishing of the intermediate result of the processing of the track of the first object until detection of a failure state of one of the one of the peer DTFs, the first DTF serving as a backup custodian of the track of the first object and the one of the one of the peer DTFs serving as a primary custodian of the track of the first object. In some cases, the message includes data associated with the track of the first object and the change in behavior is updating, by the data fusion processor, the track of the first object based on a fusion of the data included in the message with existing data associated with the track of the first object.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method for decentralized track fusion, the method comprising:
   processing, by a first decentralized track fuser (DTF), a track of a first object;
   publishing, by the first DTF, an intermediate result of the processing of the track of the first object, for reception by one or more peer DTFs to enable distributed processing of the track of the first object by the first DTF and the one or more peer DTFs;
   listening, by the first DTF, for a message transmitted from any of the one or more peer DTFs; and
   implementing, by the first DTF, a change in behavior of the first DTF based on the message.

2. The method of claim 1, wherein the message is a negotiation message and the change in behavior is accepting custodianship of a track of a second object from one of the one or more peer DTFs.

3. The method of claim 1, wherein the message is a negotiation message and the change in behavior is transferring custodianship of the track of the first object to one of the one or more peer DTFs.

4. The method of claim 1, wherein the message includes a failure status of one of the one or more peer DTFs and the change in behavior is accepting custodianship of a track of a second object from the one of the one or more peer DTFs.

5. The method of claim 1, wherein a failure to detect a heartbeat message of one of the one or more peer DTFs results in the change in behavior, and the change in behavior is accepting custodianship of a track of a second object from the one of the one or more peer DTFs.

6. The method of claim 1, wherein the message includes data associated with the track of the first object and the change in behavior is updating the track of the first object based on a fusion of the data included in the message with existing data associated with the track of the first object.

7. The method of claim 1, further comprising identifying, by the first DTF, a duplicate track, the duplicate track differing from the track of the first object by less than a threshold difference, the identification based on a negotiation with one of the one or more peer DTFs, the negotiation including kinematics data associated with the duplicate track and/or pedigree data associated with the duplicate track.

8. The method of claim 7, further comprising merging, by the first DTF, the track of the first object and the duplicate track based on the identification.

9. The method of claim 1, further comprising receiving, by the first DTF, results of fusion of data items associated with a track of a second object from one of the one or more peer DTFs for a period of time prior to accepting custodianship of the track of the second object from the one of the one or more peer DTFs.

10. The method of claim 1, further comprising suppressing, by the first DTF, publishing the intermediate result of the processing of the track of the first object until detection of a failure state of one of the one of the peer DTFs, the first DTF serving as a backup custodian of the track of the first object and the one of the one of the peer DTFs serving as a primary custodian of the track of the first object.

11. The method of claim 1, further comprises creating a new track derived from the track of the first object and a second track of the first object.

12. A decentralized track fuser (DTF) comprising:
a data fusion processor circuit to process a track of a first object;
a communications processor to publish an intermediate result of the processing of the track of the first object, for reception by one or more peer DTFs to enable distributed processing of the track of the first object by the DTF and the one or more peer DTFs; and
the communications processor further to listen for a message transmitted from any of the one or more peer DTFs, the DTF to implement a change in behavior based on the message.

13. The DTF of claim 12, further comprising:
a negotiation processor to perform negotiations between the DTF and the one or more peer DTFs; and
a custodianship processor to accept or transfer custodianship of a track of an object between the DTF and the one or more peer DTFs.

14. The DTF of claim 13, wherein the message is a negotiation message and the change in behavior is accepting, by the custodianship processor, custodianship of a track of a second object from one of the one or more peer DTFs.

15. The DTF of claim 12, wherein the message is a negotiation message and the change in behavior is transferring, by the custodianship processor, custodianship of the track of the first object to one of the one or more peer DTFs.

16. The DTF of claim 13, wherein a failure to detect a heartbeat message of one of the one or more peer DTFs results in the change in behavior, and the change in behavior is accepting custodianship of a track of a second object from the one of the one or more peer DTFs.

17. The DTF of claim 13, wherein the message includes a failure status of one of the one or more peer DTFs and the change in behavior is accepting, by the custodianship processor, custodianship of a track of a second object from the one of the one or more peer DTFs.

18. The DTF of claim 12, wherein the data fusion processor is further to identify a duplicate track, the duplicate track differing from the track of the first object by less than a threshold difference, the identification based on a negotiation with one of the one or more peer DTFs, the negotiation including kinematics data associated with the duplicate track and/or pedigree data associated with the duplicate track.

19. The DTF of claim 18, wherein the data fusion processor is further to merge the track of the first object and the duplicate track based on the identification.

20. The DTF of claim 12, wherein the custodian processing circuit is further to receive results of fusion of data items associated with a track of a second object from one of the one or more peer DTFs for a period of time prior to accepting custodianship of the track of the second object from the one of the one or more peer DTFs.

21. The DTF of claim 12, wherein the communication processor is further to suppress publishing of the intermediate result of the processing of the track of the first object until detection of a failure state of one of the one of the peer DTFs, the first DTF serving as a backup custodian of the track of the first object and the one of the one of the peer DTFs serving as a primary custodian of the track of the first object.

22. The DTF of claim 12, wherein the message includes data associated with the track of the first object and the change in behavior is updating, by the data fusion processor, the track of the first object based on a fusion of the data included in the message with existing data associated with the track of the first object.

* * * * *